United States Patent [19]

Rickenbacher

[11] 4,170,367
[45] Oct. 9, 1979

[54] SLIDING BASE

[76] Inventor: Thomas Rickenbacher, Haus Silvana, Arosa, Switzerland

[21] Appl. No.: 912,313

[22] Filed: Jun. 5, 1978

[30] Foreign Application Priority Data

Jun. 8, 1977 [CH] Switzerland ............... 7051/77

[51] Int. Cl.² ............................................. B62B 13/16
[52] U.S. Cl. ........................................ 280/18; 280/20
[58] Field of Search ............... 280/12 R, 18, 19, 20; 5/344

[56] References Cited

U.S. PATENT DOCUMENTS

| D. 116,558 | 9/1939 | Ficks | 297/191 |
|---|---|---|---|
| 2,270,598 | 1/1942 | Morgan | 190/42 |
| 2,673,744 | 3/1954 | Johnson | 280/20 |
| 3,143,748 | 8/1964 | Manning | 5/344 |
| 3,372,944 | 3/1968 | Lauritzen | 280/18 |
| 3,455,571 | 7/1969 | Dallera | 280/18 |
| 3,484,801 | 12/1969 | Carlin | 280/18 |
| 3,583,722 | 6/1971 | Jacobson | 280/20 |
| 3,625,533 | 12/1971 | Boe | 280/18 |
| 3,693,849 | 9/1972 | Knabenbauer | 280/18 |
| 3,799,566 | 3/1974 | Thompson | 280/20 |
| 3,879,775 | 4/1975 | Iwata | 5/344 |
| 4,046,393 | 9/1977 | Vadnais | 280/19 |

FOREIGN PATENT DOCUMENTS 759355  5/1967  Canada ................................. 280/18

Primary Examiner—Robert R. Song
Attorney, Agent, or Firm—Roylance, Abrams, Berdo & Farley

[57] ABSTRACT

The disclosed device is for transporting a person or other load down a snow slope. The frame is made up of upper and lower outer layers with structural foam sandwiched between them. A handle is provided at the front. A transverse hinge permits folding of a rear portion of the frame into a bottom pocket extending from the front to about half the length. Guide runners can be provided as profiling in the bottom or by separate attachment members. Snap fasteners can be provided for maintaining the folded condition.

3 Claims, 4 Drawing Figures

SLIDING BASE

BACKGROUND OF THE INVENTION

The invention relates to a sliding base for at least one person for sliding on frozen surfaces, such as snow and ice slopes.

Various constructions of sliding bases are known for sliding on snow and ice slopes. In a first sled type, sled frame supports are constructed as fixed supports made from various materials, e.g. wood, metal or plastics. Runners are either non-detachably connected to the supports or are pivotable relative to the supports, so that steering is possible during travel.

In a second sled type, essentially dimensionally stable, there are used tub-like frames which are generally made from plastic material which is processed into a dimensionally stable structure.

Both groups of sleds have the disadvantage that their manufacture is time-consuming and costly and requires expensive molds for the manufacture thereof. In addition, such sleds, particularly those of the first type, require a relatively large amount of space, so that their transportation is made more difficult.

Yet another type is known in which the support structure comprises essentially cushions. To prevent sliding sideways on starting, such cushions have runner-like structures on the bottom. The person generally sits on the cushion or lies on his stomach and by holding on to a hand grip connected to the cushion can to a certain extent steer the sliding cushion. This construction is relatively inexpensive, but requires a relatively large amount of space during transportation.

It would be desirable to so construct a sliding base of the above-indicated type so that it makes possible to satisfactorily travel on snow and ice slopes, while taking up little space during transportation.

SUMMARY OF THE INVENTION

In a novel sliding base in accordance with the present invention the sliding part is constructed as a double sheet between whose upper sheet and lower sheet is placed a foam sheet with the sliding part having a transverse fold.

BRIEF DESCRIPTION OF THE DRAWINGS

The invention is described in greater detail hereinafter relative to two embodiments and with reference to the drawings, which show.

DETAILED DESCRIPTION OF THE PREFERRED EMBODIMENTS

Figure 1:
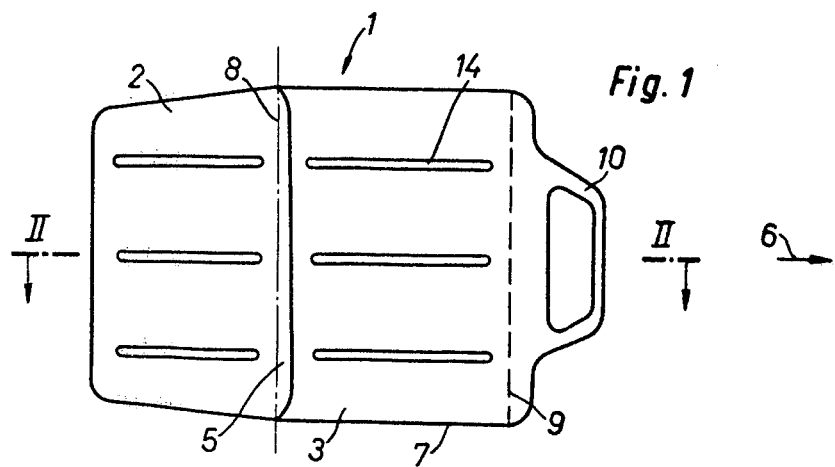
FIG. 1 a bottom plan view of the sliding surface of a sliding base according to a preferred embodiment of the present invention.
Figure 2:
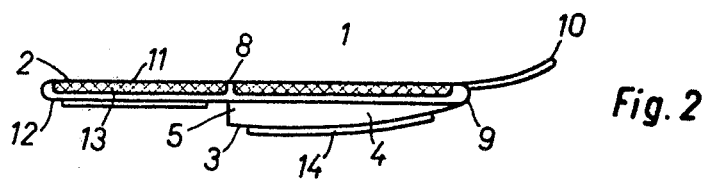
FIG. 2 a longitudinal section of the sliding base of FIG. 1 in the direction of travel along line II-II of FIG. 1.

The sliding base shown in FIGS. 1 and 2, particularly in the latter, is constructed as a double sheet and has an upper part 2 and a lower part 3. Lower part 3 only has approximately half the length of upper part 2 and is connected to the upper part 2 at its lateral edges 7. Thus, lower part 3 forms a pocket 4, whose opening 5 is directed counter to the direction of travel indicated by arrow 6. The portion of upper part 2 projecting beyond lower part 3 can be forced through opening 5 into pocket 4 for transportation purpose. For this purpose, immediately at opening 5 of pocket 4 a transverse fold 8 is provided, being indicated in the drawings by the broken line. It is also possible to provide further folds (not shown), preferably longitudinal folds in the direction of travel 6, in order to obtain further foldability of the sliding base 1.

A hand grip 10 is provided at the front end 9 of upper part 2 to be used by the person using the sled for either holding purposes or for steering the sliding base 1. Optionally, hand grip 10 can have a fold in the vicinity of the front end 9 of upper part 2, so that it can be folded back during transportation. On further folding, hand grip 10 is covered by upper part 2. Sliding base 1 then forms a relatively small package, which can optionally be introduced into an additional pocket and consequently remains in its folded position. As can be seen in FIG. 2, the upper part 2 is constructed as a double sheet having an upper sheet 11 and a lower sheet 12 which are interconnected at their edges. Between the two sheets 11 and 12 it is possible to place an insert in the form of a further sheet 13, e.g. a foam sheet. Advantageously, sheet 13 is interrupted at fold 8 in order to facilitate folding.

To ensure that the direction of travel can be maintained, even if transverse forces act on sliding base 1, runner-like thickened portions 14 are provided in the direction of travel 6, three runners 14 being shown on lower part 3 and three runners on the bottom of the rear portion of upper part 2. Advantageously, thickened portions 14 are removed in the vicinity of transverse fold 8, so that ease of folding is ensured. However, for longitudinal folds, which are advantageously positioned alongside thickened portions 14, no special measures need be taken, although the foam sheet 13 may be provided with further breaks, similar to fold 8, in order to further facilitate the folding of sliding base 1.

Sliding base 1 is advantageously made from plastic material. For example, a polyethylene sheet is suitable as the material for double sheet 2, 3. If a foam sheet 13 is used, this can for example comprise a polyethylene foam.

Figure 3:
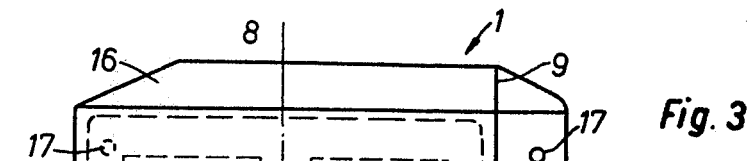
FIG. 3 a bottom plan view of a further embodiment of a sliding base in accordance with the present invention.
Figure 4:
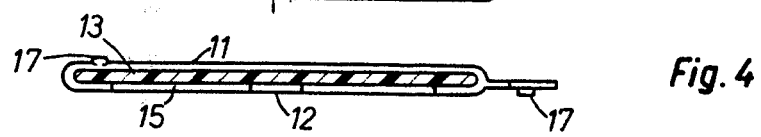
FIG. 4 a longitudinal section of the sliding base of FIG. 3 in the direction of travel along line IV—IV of FIG. 3.

Although the sliding base 1 according to FIGS. 1 and 2 is relatively easy to manufacture and can be easily transported, it can, as shown in FIGS. 3 and 4, be further simplified and improved. The sliding base 1 according to FIGS. 3 and 4 has an upper sheet 11 and a lower sheet 12, which form a closed inner space into which is inserted a foam sheet 13, advantageously polyethylene foam. In the vicinity of the sheet 13, the two sheets 11 and 12 are unprofiled, as opposed to the construction of FIGS. 1 and 2, where the thickened portions 14 are provided in this area. Such thickened portions additionally stress the lower sheet and are therefore omitted in the construction of FIGS. 3 and 4. However, in all cases a device for guiding the sliding base 1 is required. In the construction according to FIGS. 3 and 4, this problem is solved by placing shallow contouring members 15, such as plastic ribs in the inner space of sheets 11 and 12 between the foam sheet 13 and the lower sheet 12, so that the lower sheet 12 conforms to them. The contouring members are fixed to the foam sheet 13, but are completely separate from the lower sheet 12. Nevertheless, the guidance of sliding base 1 through said contouring members 15 is achieved in the same way as with the thickened portions in the construction of FIGS. 1 and 2. The contouring members 15 are indicated in the FIG. 3 by broken lines, but because they are so shallow are not made visible in the FIG. 4.

The sliding base 1 of FIGS. 3 and 4 can also have a transverse fold 8, so that it can also be folded and easily transported. To further facilitate transportation, it is possible to place on upper sheet 11 and the bottom of hand grip 10 a snap fastener 17 which maintains sliding base 1 in the folded state. Marginal portions 16 can be provided on the sides of sliding base 1. These merely comprise parts of the two sheets 11 and 12, with no intermediate foam sheet. On folding the sliding base, marginal portions 16 are first folded around the edges and then the sliding base is folded.

It is important that the said sliding bases 1 have a relatively thin construction with no voluminous parts. Nevertheless, a highly satisfactory sled is formed, which in the folded state can be inexpensively and easily transported to the sledding area, where it can be unfolded and used for sledding. When sledding is at an end, sliding base 1 can be folded again equally easily and can either be placed in pocket 4 or held together with the fastener 17. Longitudinal folds can be provided in addition to the transverse folds 8, 9.

I claim:

1. A sliding base for transporting a load over a frozen surface, said base being of the type having a handgrip and a sliding part, wherein said sliding part is improved and comprises the combination of:
    an upper sheet of flexible material;
    a lower sheet of flexible material spaced from said upper sheet and attached at its edges to said upper sheet;
    a sheet of resilient foam material sandwiched between said upper and lower sheets;
    means defining a transverse hinged portion for permitting folding of said sliding part, and
    a plurality of runner-like contouring inserts extending parallel to the direction of travel of said base and fastened between said sheet of foam material and the inside of said lower sheet.

2. A sliding base according to claim 1, wherein said runner-like inserts are adhered to the bottom of said sheet of foam material.

3. A sliding base according to claim 1, and further comprising at least one snap fastener on said upper sheet and on the bottom of said handgrip for maintaining said sliding base in the folded state.

* * * * *